United States Patent
Le Chevalier (10) Patent No.: US 11,854,548 B1
(45) Date of Patent: *Dec. 26, 2023

(54) ADAPTIVE CONVERSATION SUPPORT BOT

(71) Applicant: Wells Fargo Bank, N.A., San Francisco, CA (US)

(72) Inventor: Vincent Le Chevalier, San Jose, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,891

(22) Filed: Nov. 22, 2022

Related U.S. Application Data (63) Continuation of application No. 17/248,032, filed on Jan. 6, 2021, now Pat. No. 11,551,691, which is a continuation of application No. 15/668,560, filed on Aug. 3, 2017, now Pat. No. 10,891,947.

(51) Int. Cl.

| | |
|---|---|
| *G10L 15/02* | (2006.01) |
| *G10L 15/22* | (2006.01) |
| *G10L 15/18* | (2013.01) |
| *H04R 1/40* | (2006.01) |
| *G10L 17/22* | (2013.01) |
| *G06F 16/635* | (2019.01) |
| *G10L 15/08* | (2006.01) |

(52) U.S. Cl.
CPC ............ *G10L 15/22* (2013.01); *G06F 16/635* (2019.01); *G10L 15/1815* (2013.01); *G10L 17/22* (2013.01); *H04R 1/403* (2013.01); *G10L 2015/088* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 6,404,859 | B1 | 6/2002 | Hasan |
| 6,975,983 | B1 | 12/2005 | Fortescue et al. |
| 7,890,871 | B2 | 2/2011 | Etkin |
| 8,117,036 | B2 | 2/2012 | Bedingfield, Sr. |

(Continued)

FOREIGN PATENT DOCUMENTS

| | | | |
|---|---|---|---|
| GB | 2513821 A | 11/2014 | |

OTHER PUBLICATIONS

"U.S. Appl. No. 15/668,560, Examiner Interview Summary dated Jul. 28, 2020", 3 pgs.

(Continued)

*Primary Examiner* — Jakieda R Jackson (74) *Attorney, Agent, or Firm* — SCHWEGMAN LUNDBERG & WOESSNER, P.A.

(57) ABSTRACT

Systems and techniques for adaptive conversation support bot are described herein. An audio stream may be obtained including a conversation of a first user. An event may be identified in the conversation using the audio stream. A first keyword phrase may be extracted from the audio stream in response to identification of the event. The audio stream may be searched for a second keyword phrase based on the first keyword phrase. An action may be performed based on the first keyword phrase and the second keyword phrase. Results of the action may be out via a context appropriate output channel. The context appropriate output channel may be determined based on a context of the conversation and a privacy setting of the first user.

20 Claims, 4 Drawing Sheets

(56) References Cited

U.S. PATENT DOCUMENTS

| | | |
|---|---|---|
| 8,537,983 B1 | 9/2013 | Haggerty |
| 8,611,507 B2 | 12/2013 | Mikan et al. |
| 8,849,931 B2 | 9/2014 | Linner et al. |
| 8,972,506 B2 | 3/2015 | Frazier et al. |
| 9,148,741 B2 | 9/2015 | Gordon et al. |
| 9,172,747 B2 | 10/2015 | Walters |
| 9,189,742 B2 | 11/2015 | London |
| 9,276,802 B2 | 3/2016 | Lynch et al. |
| 9,313,210 B2 | 4/2016 | Coletrane et al. |
| 9,368,114 B2 | 6/2016 | Larson et al. |
| 9,449,080 B1 | 9/2016 | Zhang |
| 9,462,112 B2 | 10/2016 | Woolsey et al. |
| 9,472,188 B1 | 10/2016 | Ouimette et al. |
| 9,560,089 B2 | 1/2017 | Lynch et al. |
| 10,095,785 B2 | 10/2018 | Bates |
| 10,891,947 B1 | 1/2021 | Le Chevalier |
| 2002/0103647 A1 | 8/2002 | Houplain et al. |
| 2003/0105634 A1 | 6/2003 | Abella et al. |
| 2005/0283475 A1 | 12/2005 | Beranek et al. |
| 2006/0053196 A1 | 3/2006 | Spataro et al. |
| 2006/0126529 A1 | 6/2006 | Hardy |
| 2006/0156326 A1 | 7/2006 | Goronzy et al. |
| 2008/0065623 A1 | 3/2008 | Zeng et al. |
| 2008/0077558 A1 | 3/2008 | Lawrence et al. |
| 2008/0300872 A1 | 12/2008 | Basu et al. |
| 2009/0164573 A1 | 6/2009 | Bravery et al. |
| 2009/0282019 A1 | 11/2009 | Galitsky et al. |
| 2009/0328136 A1 | 12/2009 | Wan et al. |
| 2010/0149090 A1 | 6/2010 | Morris et al. |
| 2010/0174709 A1 | 7/2010 | Hansen et al. |
| 2011/0161067 A1 | 6/2011 | Lesher et al. |
| 2012/0204104 A1 | 8/2012 | Walsh |
| 2013/0031476 A1 | 1/2013 | Coin et al. |
| 2013/0054749 A1 | 2/2013 | Yao et al. |
| 2013/0116012 A1 | 5/2013 | Okayasu |
| 2013/0198653 A1 | 8/2013 | Tse et al. |
| 2013/0246525 A1 | 9/2013 | Patil et al. |
| 2013/0266127 A1 | 10/2013 | Schachter et al. |
| 2013/0275899 A1 | 10/2013 | Schubert et al. |
| 2013/0315108 A1 | 11/2013 | Lindner et al. |
| 2014/0067375 A1 | 3/2014 | Wooters |
| 2014/0149401 A1 | 5/2014 | Liu et al. |
| 2014/0164305 A1 | 6/2014 | Lynch et al. |
| 2014/0164532 A1 | 6/2014 | Lynch et al. |
| 2014/0164953 A1 | 6/2014 | Lynch et al. |
| 2014/0337131 A1 | 11/2014 | Edara |
| 2014/0362738 A1 | 12/2014 | Neystadt et al. |
| 2015/0162000 A1 | 6/2015 | Di Censo et al. |
| 2015/0195406 A1 | 7/2015 | Dwyer et al. |
| 2015/0206443 A1 | 7/2015 | Aylesworth et al. |
| 2015/0228280 A1 | 8/2015 | Watanabe et al. |
| 2015/0279368 A1 | 10/2015 | Contolini et al. |
| 2015/0281454 A1 | 10/2015 | Milstein et al. |
| 2015/0356836 A1 | 12/2015 | Schlesinger et al. |
| 2015/0382147 A1 | 12/2015 | Clark et al. |
| 2016/0012198 A1 | 1/2016 | Gainer, III et al. |
| 2016/0171062 A1 | 6/2016 | Bufe et al. |
| 2016/0191709 A1 | 6/2016 | Pullamplavil et al. |
| 2016/0240213 A1 | 8/2016 | Wen et al. |
| 2016/0337510 A1 | 11/2016 | Li, I et al. |
| 2016/0371509 A1 | 12/2016 | Unitt |
| 2016/0378747 A1 | 12/2016 | Orr et al. |
| 2016/0379633 A1 | 12/2016 | Lehman et al. |
| 2016/0381205 A1 | 12/2016 | You et al. |
| 2017/0018272 A1 | 1/2017 | Lee et al. |
| 2017/0034176 A1 | 2/2017 | Qi et al. |
| 2017/0133038 A1 | 5/2017 | Jiang et al. |
| 2018/0007087 A1 | 1/2018 | Grady et al. |
| 2018/0068656 A1 | 3/2018 | Lehman et al. |
| 2018/0206055 A1 | 7/2018 | Di Censo et al. |
| 2018/0211658 A1 | 7/2018 | Segal et al. |

OTHER PUBLICATIONS

"U.S. Appl. No. 15/668,560, Final Office Action dated May 20, 2020".

"U.S. Appl. No. 15/668,560, Final Office Action dated Sep. 9, 2019".

"U.S. Appl. No. 15/668,560, Non Final Office Action dated Jan. 28, 2020".

"U.S. Appl. No. 15/668,560, Non Final Office Action dated May 2, 2019", 14 pgs.

"U.S. Appl. No. 15/668,560, Notice of Allowance dated Sep. 10, 2020", 7 pgs.

"U.S. Appl. No. 15/668,560, Response filed Apr. 28, 2020 to Non Final Office Action dated Jan. 28, 2020".

"U.S. Appl. No. 15/668,560, Response filed Aug. 2, 2019 to Non-Final Office Action dated May 2, 2019", 14 pgs.

"U.S. Appl. No. 15/668,560, Response filed Aug. 19, 2020 to Final Office Action dated May 20, 2020".

"U.S. Appl. No. 15/668,560, Response filed Dec. 9, 2019 to Final Office Action dated Sep. 9, 2019", 11 pgs.

"U.S. Appl. No. 17/248,032, Non Final Office Action dated Mar. 21, 2022".

"U.S. Appl. No. 17/248,032, Notice of Allowance dated Sep. 30, 2022".

"U.S. Appl. No. 17/248,032, Response filed Jun. 16, 2022 to Non Final Office Action dated Mar. 21, 2022", 17 pgs.

"Wearable Computing", Georgia Institute of Technology; Innovations at Georgia Tech, (2017), 4 pgs.

Isbister, Katherine, et al., "Helper Agent: Designing an Assistant for Human-Human Interaction in a Vitrual Meeting Space", CHI '2000 The Hague, Amsterdam, (Apr. 2000), 9 pgs.

Lyons, Kent, et al., "Augmenting conversations using dual-purpose speech", UIST '04, Santa Fe, New Mexico, USA., (Oct. 24, 2004), 10 pgs.

Lyons, Kent, et al., "Providing support for mobile calendaring conversations: a wizard of oz evaluation of dual-purpose speech", ACM International Conference Proceeding Series; vol. 111: Proceedings of the 7th international conference on Human computer interaction with mobile devices & services, (Sep. 2005), 4 pgs.

Popescu-Belis, Andrei, et al., "A Speech-based Just-in-Time Retrieval System using Semantic Search", HLT '11 Proceedings of the 49th Annual Meeting of the Association for Computational Linguistics: Human Language Technologies: Systems Demonstrations, (Aug. 2011), 8 pgs.

Popescu-Belis, Andrei, et al., "The ACLD: speech-based just-in-time retrieval of meeting transcripts, documents and websites", SSCS '10 Proceedings of the 2010 international workshop on Searching spontaneous conversational speech, (Oct. 29, 2010), 4 pgs.

Smith, Cameron, et al., "Interaction strategies for an affective conversational agent", Presence, vol. 20 No. 5 Massachusetts Institute of Technology, (Sep. 2010), 17 pgs.

Starner, Thad, "Reading Your Mind: Interfaces for Wearable Computing", Ubiquitous Virtual Reality. ISUVR 2008 International Symposium, (2008), 1 pg.

Wang, Hao Chuan, et al., "Effects of interface interactivity on collecting language data to power dialogue agents", Chinese CHI '14, (Apr. 2014), 4 pgs.

ADAPTIVE CONVERSATION SUPPORT BOT

CROSS-REFERENCE TO RELATED APPLICATION

This application is a continuation of U.S. patent application Ser. No. 17/248,032, filed Jan. 6, 2021, which is a continuation of U.S. patent application Ser. No. 15/668,560, filed Aug. 3, 2017, now issued as U.S. Pat. No. 10,891,947, which is incorporated by reference herein in its entirety.

TECHNICAL FIELD

Embodiments described herein generally relate to voice-enabled assistants and, in some embodiments, more specifically to an adaptive conversation support bot.

BACKGROUND

A virtual assistant application may operate on an internet connected mobile device. The virtual assistant application may receive voice commands from a user. The virtual assistant may complete actions in response to the voice commands.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The successful deployment of virtual assistants running in connected devices have enabled new types of interactions between individuals and online services by introducing voice enabled features that may allow a user to request information in a conversational manner. Although traditional virtual assistants continue to be integrated into our everyday lives, they may lack the ability to adapt to a context of an environment in which a user is conversing. In addition, traditional virtual assistants may lack the ability to directly interject during an active conversation without having to be specifically prompted to do so. Furthermore, traditional virtual assistants may lack privacy controls for controlling how information is securely presented back to the user.

The present subject matter provides a personal assistant that may listen in real-time to an active conversation in order to be able to interject as needed without a specific prompt command allowing more timely and relevant information to the user. The described techniques, for example, enable the virtual assistant to adjust a response based on changes detected in the context of the environment in which the conversation occurs. By listening to and analyzing the context properties of the environment of the conversation, the virtual assistant may output a response that best matches the environmental context of the conversation. Thus, the virtual assistant may effectively adapt a response based on context changes in real-time.

In an example, the present subject matter may be implemented as a software platform that may include a front-end virtual assistant mobile application interfaced with back-end systems. The virtual assistant mobile application may listen in real-time to an active conversation including the user and may interject on-demand and automatically based on events detected in the conversation. The present subject matter may direct the output to an output channel (e.g., audio, text, email, etc.) based on a level of privacy indicated by the environmental context of the conversation and privacy settings configured by the user. For example, John may utter aloud to himself "what time is my doctor appointment tomorrow?" and, the virtual assistant application, having determined that there are other people in the environment, may send John a text with the details of the doctor appointment scheduled for tomorrow.

The present subject matter may allow a virtual assistant to listen to a live conversation and deconstruct and analyze the live conversation to preemptively identify key words giving specific information about the context of the conversation. By deconstructing and analyzing the live conversation, the virtual assistant may be able to leverage computational resources to identify elements of relevant additional information to the on-going conversation. The elements of additional information may be output into the conversation based on a set of applicable privacy rules that govern the interactions between the virtual assistant and the user. Thus, the virtual assistant may react similar to a person by interjecting in a conversation between multiple individuals. The virtual assistant may leverage a variety of pre-set communication methods such as, by way of example and not limitation, voice, text messages, pictures, emails, etc. and may transmit the output to one, a subset, or all participants in the active conversation.

Figure 1:
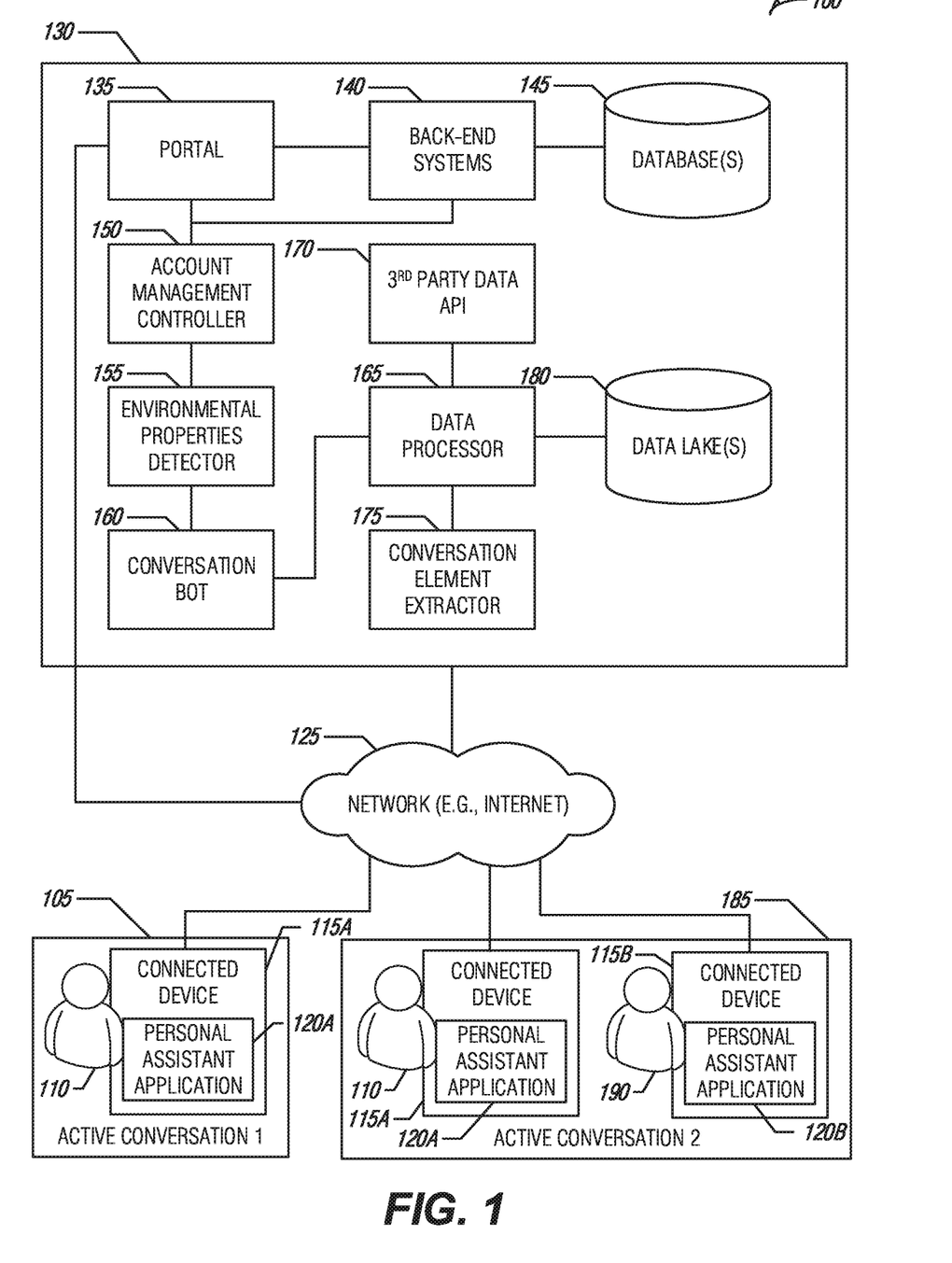
FIG. 1 is a block diagram of an example of an environment in which an adaptive conversation support bot may be implemented, according to an embodiment.

FIG. 1 is a block diagram of an example of an environment 100 in which an adaptive conversation support bot may be implemented, according to an embodiment. The environment 100 may include a first active conversation 105 including speech of a first user 110 captured by a first connected device 115A including a first personal assistant application 120A and a second active conversation 185 including speech of the first user 110 and a second user 190 captured by the first connected device 115A including the first personal assistant application 120A and a second connected device 115B including a second personal assistant application 120B.

The first active conversation 105 and the second active conversation 185 may both include the first user 110 and may be occurring concurrently or at different times. For example, the first user 110 may be conversing with the second user 190 over a teleconference (e.g., the second active conversation 185, etc.) and may be conversing directly with the first personal assistant application 120A (e.g., the first active conversation 105, etc.) during breaks in the conversation with the second user 190. In another example, the first user 110 may have completed the first active conversation 105 and may subsequently begin the second active conversation 185 upon beginning a teleconference with the second user 190.

The first connected device 115A and the second connected device 115B collectively referred to as the connected devices 115A and 115B. The first active conversation 105 may be captured by the first connected device 115A and the second active conversation 185 may be captured by one or both of the connected devices 115A and 115B. The first personal assistant application 120A and the second personal assistant application 120B collectively referred to as the personal assistant applications 120A and 120B. The connected devices 115A and 115B may be communicatively coupled via network 125 (e.g., the internet, cellular network, etc.) to a system 130. The system 130 may include a variety of components for identifying, analyzing, and sharing relevant conversation information and may include a portal 135, back-end systems 140, database(s) 145, an account management controller 150, an environmental properties detector 155, a conversation bot 160, a data processor 165, a third-party data API 170, a conversation element extractor 175, and data lake(s) 180.

The conversation 105 may include the first user 110 conversing with another person or making an utterance out loud. For example, the user may say "My flight to San Francisco is at <pause> I forget." The first user 110 may be registered with the first personal assistant application 120A included with the first connected device 115A (e.g., a mobile device, smartphone, tablet, personal computer, game system, wearable device, personal assistant device, etc.). The connected device may include a microphone that captures audio from the environment 100 including the conversation 105.

The first personal assistant application 120A and may be a software application executing on the first connected device 115A that is able to receive an audio stream from the first connected device 115A in real-time. The first personal assistant application 120A may provide a user interface for registering the first user 110 with the system 130 and may provide for the establishment of a secure communication channel between the first connected device 115A and the portal 135. The first personal assistant application 120A may provide a user interface for secure login for selecting a current user (e.g., first user 110) of the personal assistant application 130. The personal assistant application 110 may provide a user interface for configuring user settings such as, for example, privacy settings, preferred output channels (e.g., voice, text, email, pictures, etc.).

The portal 135 may be a gateway (e.g., proxy, etc.) to applications and/or data containing information relevant to the first active conversation 105. The portal 135 may provide registered users (e.g., first user 110, user 190, etc.) with the ability to manage user account settings. The settings may be configured via a user interface provided by the portal 135 and via a user interface of the personal assistant applications 120A and 120B and may include personal rules for delivering output of the conversation bot 160. The portal 135 may provide notifications and reports to providing an input mechanism for user inputs and authorization. The user interface may be presented in a number of mediums including, by way of example, and not limitation, audio, graphical, text-based, etc. The portal 135 may obtain an audio stream including the first active conversation 105 of the first user 110. For example, an audio stream including the user saying "My flight to San Francisco is at <pause> I forget" may be received.

The portal 135 may work in conjunction with the conversation bot 160 to process the received audio stream. The conversation bot 160 may identify an event in the first active conversation 105. For example, the conversation bot 160 may identify the pause in the audio stream as an event. The conversation bot 160 may work in conjunction with the conversation element extractor 175 to extract a first keyword phrase from the audio stream. For example, the conversation element extractor 175 may extract "I forget" from the audio stream as the first keyword phrase. The conversation element extractor 175 may use the first keyword phrase to search for a second keyword phrase. For example, the conversation element extractor may search prior to the utterance of "I forget" to identify "flight" and "San Francisco" from the audio stream as the second keyword phrase.

The conversation bot 160 may perform an action (e.g., initiate a search, provide user feedback, set an alarm, submit the second keyword phrase as input to the back-end systems 140 and/or the third-party data API, etc.) based on the second keyword phrase. For example, the conversation bot may initiate a search for information. The conversation bot 160 may pass the second keyword phrase to the data processor 165. The data processor 165 may identify information relevant to the user using the second keyword phrase. The data processor 165 may be communicatively connected (e.g., via wired network, wireless network, etc.) to a variety of data sources such as, for example, the back-end systems 140, the third-party data API 170, the database(s) 145, and the data lake(s) 180. The back-end systems 140 may include a variety of application systems that may contain information associated with the first user 110 such as, for example, an enterprise data warehouse. The third-party data API 170 may provide access to external (e.g., third-party, etc.) systems that may contain information associated with the first user 110. The database(s) 145 may contain a data catalog, a metadata catalog, data access rules, and a record of changes made to data. The data lake(s) 180 may include an infrastructure of analytical datasets that may contain collections of domain specific conversation topics such as, for example, finance, politics, sports, travel, business, government, transportation, etc.

The data processor 165 may access the data sources using the second keyword phrase to identify information and/or actions that are relevant to the second keyword and the user. For example, the data processor 165 may access a calendaring application included in the back-end systems 140 to identify a day and time for a flight on a calendar of the first user 110. In another example, the data processor 165 may access the third-party data API 170 and may search for a time and day of a flight in an airline ticketing database using credentials of the first user 110.

The data processor 165 may use machine learning techniques (e.g., linear regression, cluster analysis, deep learning, etc.) to learn data sources to access for information and the type of information to be retrieved. The data processor 165 may store (e.g., in the data lake(s) 180, etc.) successful information retrievals (e.g., information was found, user provided positive feedback, etc.) to use a training data for improving data source identification and data type identification. The data may also be used by the data processor 165 to establish relationships between keyword phrase input and expected output. The data processor 165 may present output to the conversation bot 160 for output to the first user 110 via the preferred output channel. For example, the data processor 165 may retrieve a flight to San Francisco for the first user 110 at 1:10 PM on Thursday and the conversation bot 160 may generate output for delivery via voice by emitting the audio "Your flight to San Francisco is Thursday at 1:10 PM" from a speaker in the first connected device 115A.

The first user 110 may be engaged in the second active conversation 185 with the second user 190. The first user 110 and the second user 190 may be in proximity with each other or may be conversing remotely (e.g., using teleconference, telephone, web conference, etc.). The speech of the first user 110 and the second user 190 may be captured by the respective personal assistant applications 120A and 120B included with their respective connected devices 115A and 115B. The first user 110 may ask the second user 190 "Do you remember what was said at yesterday's meeting?"

The portal 135 may work in conjunction with the conversation bot 160 to process the audio stream received from the personal assistant applications 120A and 120B. The conversation bot 160 may identify an event in the second active conversation 185. In an example, the event may be detection of the first keyword phrase in the conversation included in the audio stream. For example, the conversation bot 160 may work in conjunction with the conversation element extractor 175 to identify "remember" in the audio stream as the first keyword phrase and as an event. The conversation element extractor 175 may use the first keyword phrase to search for a second keyword phrase. For example, the conversation element extractor may search prior to and subsequent to the utterance of "remember" to identify "yesterday" and "meeting" from the audio stream as the second keyword phrase.

The second keyword phrase may be presented to the data processor 165 which may access the data sources to identify relevant information. For example, data source for the first user 110 and the second user 190 may be accessed to identify a meeting yesterday that both the first user 100 and the second user 190 attended. The data processor 165 may retrieve information relevant to the identified meeting such as meeting minutes stored in an email application database included in the back-end systems 140. The information retrieved by the data processor 175 may be presented to the conversation bot 160 for output to the first user 110 and the second user 190 via their respective preferred output channels. For example, each connected device 115A and 115B may display the text of the meeting minutes or play audio of the meeting (or meeting minutes) using their respective personal assistant applications 120A and 120B.

The conversation bot 160 may work in conjunction with the account management controller 150 to determine a context appropriate output channel for outputting the results of a performed action. The context appropriate output channel may be based on a context of the conversation (e.g., the first active conversation 105, the second active conversation 185, etc.) and a privacy setting of the user (e.g., the first user 110, the second user 190, etc.). The privacy settings may be stored in a profile of a user such as the first user 110.

A single user privacy option may cause the account management controller 150 to direct the conversation bot 160 to output information directly to the first user 110 using the preferred output channel. For example, the first user 110 may have asked if the second user 190 remembered what said in yesterday's meeting and the meeting minutes may be delivered directly to the first user 110 and not the second user 190.

A group privacy option may cause the account management controller 150 to direct the conversation bot 160 to output information to other registered participants (e.g., friends, connections, everyone, etc.) of the conversation. For example, the first user 110 may have asked if the second user 190 remembered what said in yesterday's meeting and the meeting minutes may be delivered directly to the first user 110 and the second user 190.

A location-based privacy option may cause the account management controller 150 to direct the conversation bot 160 to output information to the first user 110 and/or others based on the location of the first user 110. For example, the meeting minutes may be delivered via a text to a smartphone of the first user 110 rather than via voice using the speaker of the first connected device 115A when geolocation data provided by the first connected device 115A to the conversation bot 160 indicates the first user 110 is in a public place.

An authentication privacy option may cause the account management controller 150 to direct the conversation bot 160 to output information to the first user 110 with an authentication mechanism (e.g., biometric fingerprint authentication, etc.) preventing output of the information until the first user 110 is authenticated. For example, the meeting minutes may be prepared for output and the first user 110 may be presented with a prompt by the first personal assistant application 120A to provide a fingerprint scan and the output may be delivered to a display of the first connected device 115A upon successful authentication of the fingerprint scan.

In an example, the first user 110 may be presented with a configuration user interface allowing configuration of privacy settings and corresponding preferred output channels. The account management controller 150 may work in conjunction with the environmental properties detector 155 to determine the context of an active conversation and may select the appropriate privacy setting and preferred output channel based on the context. For example, multiple speakers including the first user 110 may be identified in the audio stream by the environmental properties detector 155 and identified as taking place at a supermarket and the account management controller 150 may direct the conversation bot 160 to output the San Francisco flight information as a text to a smartphone (e.g., the first connected device 115A, an additional connected device of the first user 110, etc.) of the first user 110.

The environmental property detector 155 may monitor for changes in the environmental context in which a conversation is occurring that may affect the conditions for replying to the first user 110. The conversation bot 160 may use noise cancellation and filtering techniques for adjusting the received audio stream. Additionally, the conversation bot 160 may work in conjunction with the environmental property detector 155 to identify changes in the environment context and adjust output based on the identified changes. For example, the second active conversation 185 may begin in a quiet and near noiseless area and the environmental properties detector 155 may determine that background noise has increased (e.g., due to music playing, traffic noise, etc.).

The conversation bot 160 may adjust the output based on the environmental context change determined by the environmental properties detector 155. By way of example and not limitation, the conversation bot 160 may increase the sound volume of the next output, decrease the sound volume of the next output, maintain the volume level for the next output, delay the output until the environmental context returns to an acceptable noise level, repeat a previous output at an increased sound volume, whisper the next output (e.g., at a volume and frequency that has a short travel distance), etc. based on the environmental context change identified by the environmental properties detector 155.

The conversation bot 160 may add a reference to the change detected in the environmental context identified by the environmental properties detector 155 when generating output for delivery to the first user 110. For example, the output may include "I detected an incoming call and I am going to pause my reply to your last question" in response to the environmental properties detector 155 determining that the first user 110 is receiving a call (e.g., by detecting a ringtone, as indicated by an API call, etc.). In an example, the reference may include a prompt for input to make an adjustment to the output. For example, the output may include "I detected a change in your environment would you like me to lower the volume of my conversation?" or "I detected another conversation in your environment would you like me to whisper my replies to you?" The conversation bot 160 may access a list of actions to perform based on identified environmental context changes and/or may learn appropriate responses using machine learning techniques (e.g., linear regression, etc.).

The conversation bot 160 may change the preferred output channel based on a change in the environmental context determined by the environmental properties detector 155. The first user 110 may have a plurality of output devices (not shown) in the environment 100 which may be communicatively coupled to the conversation bot 160. For example, the first user 110 may have a personal assistant device, a smart phone, a tablet, and a smart television that are connected to the conversation bot 160 via the internet. The preferred output channel for the first user 110 may be voice via the personal assistant device, however, the environmental context of the personal assistant device may have changed from quiet to noisy because loud music is playing (e.g., as detected by the environmental properties detector 155) and the preferred output channel may be changed to text via the smartphone based on the noisy environmental context of the personal assistant device. In an example, the output may be output to the first connected device 115A and the first personal assistant application 120A may transmit the output to one or more devices connected to the first connected device 115A (e.g., wireless speakers, etc.).

The conversation bot 160 may include an indication of the change in output channel by outputting of example, "Due to the high level of noise in this location, I am switching to 'smartphone' for continuing out conversation." In an example, the conversation bot 160 may suspend activity based on the identified change in the environmental context. For example, the conversation bot may output "Switching off personal assistant functions from this location until satisfactory environmental conditions are restored." In an example, the conversation bot may output to a plurality of output channels (all devices, a subset of devices, etc.) in response to the change in the environmental context. For example, the conversation bot may output a notification stating "Sending replies to all connected devices until the environmental conditions have returned to an acceptable level."

Delivery devices may include one or more omnidirectional speakers and the conversation bot 160 may generate output that activates the speakers in a directional pattern focusing the audio energy in the direction of the first user 110. The environmental properties detector 155 may determine a location of the first user 110 (e.g., using geolocation data obtained from a smartphone, wearable, etc.) and a location of the speakers (e.g., using geolocation data of the speakers), and determine a vector from the preferred speakers and the location of the first user 110. The conversation bot may generate output including instructions for activating the speakers with output power concentrated along the vector. Additionally or alternatively, the output may be transmitted to multiple output devices at varying output power levels to concentrate output power along the vector. Thus, the conversation bot 160 may adjust how and where output is delivered based on changes in the environmental context in which a conversation is occurring resulting in enhanced delivery of output in environments with variable context.

Figure 2:
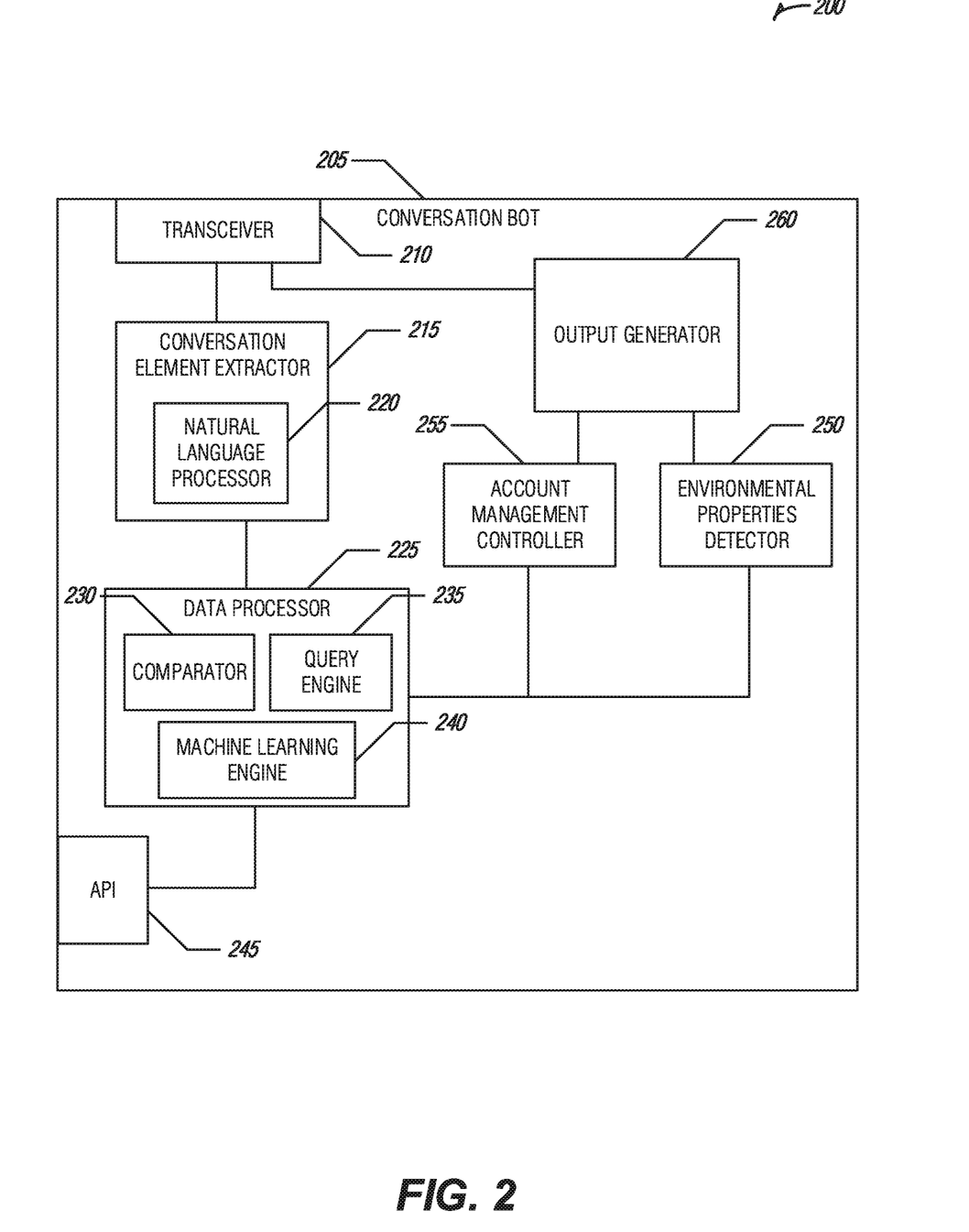
FIG. 2 illustrates an example of a system for implementing an adaptive conversation support bot, according to an embodiment.

FIG. 2 illustrates an example of a system 200 for implementing an adaptive conversation support bot, according to an embodiment. The system 200 may provide features as described in FIG. 1. The system 200 may include a conversation bot 205. The conversation bot may include a variety of components such as a transceiver 210, a conversation element extractor 215, a data processor 225, an application programming interface (API) 245, an environmental properties detector 250, an account management controller 255, and an output generator 260.

The transceiver 210 may manage incoming and outgoing data traffic between the conversation bot 205 and connected systems or devices. The transceiver 210 may be communicatively coupled to a network (e.g., the internet, wired network, wireless network, cellular network, etc.). The transceiver 210 may obtain an audio stream including a conversation of a first user. For example, the first user may use a device connected (e.g., the connected devices 115A and 115B as described in FIG. 1) to the conversation bot 205 using a personal assistant application (e.g., the personal assistant applications 120A and 120B as described in FIG. 1). The personal assistant application may capture an audio stream of an active conversation (e.g., the first active conversation 105 as described in FIG. 1) of the user via a microphone included with the connected device. The transceiver 210 may transmit the audio stream to the conversation element extractor 215.

The conversation element extractor 215 may include a natural language processor 220. The conversation element extractor 215 may use the natural language processor 220 to identify an event in the conversation using the audio stream. In an example, the event may be a non-transitional pause (e.g., pause in the middle of a sentence, an unexpected pause, etc.) detected in the conversation included in the audio stream. While pauses may be expected during transitions between sentences and other language elements, a transitional pause may be an unexpected pause, for example, in the middle of a sentence. The non-transitional pause may be an indication that the user is searching for information. For example, the natural language processor 220 may determine the user has said "My flight to San Francisco is at <pause> I forget" and the non-transitional pause in the sentence may be identified as the event. In an example, the event may be a detection of a first keyword phrase in the conversation included in the audio stream. For example, the conversation may include the user asking another person "Do you remember what was said at yesterday's meeting?" and "remember" may be identified as the first keyword phrase and the event.

The conversation element extractor 215 may, in response to identifying the event, extract a first keyword phrase from the audio stream. For example, the user may have said "My flight to San Francisco is at <pause> I forget" and "I forget" may be extracted as the first keyword phrase. In another example, the user may have said "Do you remember what was said at yesterday's meeting?" and "remember" may be extracted as the first keyword phrase. The conversation element extractor 215 may search the audio stream for a second keyword phrase based on the first keyword phrase.

The conversation element extractor 215 may maintain a set of directional rules corresponding with keyword phrases that indicate whether the conversation element extractor 215 should search the audio stream before the event, after the event, or before and after the event. In an example, the set of directional rules may be created or modified using machine learning by identifying in training data the most likely location of the second keyword phrase given a first keyword phrase. Identifying the directionality may increase processing efficiency by reducing the portion of the audio stream to be processed using the natural language processor 220 and searched by the conversation element extractor 215 for the second keyword phrase.

In an example, a search direction corresponding to the first keyword phrase may be determined (e.g., by access the set of directional rules, etc.) and, in response to the search direction being determined as reverse, a portion of the audio stream occurring for a time period before the event may be searched for the second keyword phrase. For example, the first keyword phrase "I forget" may cause the conversation element extractor 215 to search prior to the pause to extract the second keyword phrase "flight San Francisco" from the audio stream.

In an example, a search direction corresponding to the first keyword phrase may be determined and, in response to the search direction being determined as omnidirectional, a first portion of the audio stream occurring for a time period before the event and a second portion of the audio stream occurring after the event may be searched for the second keyword phrase. For example, the first keyword phrase "remember" may cause the conversation element extractor 215 to search before and after "remember" in the audio stream to extract the second keyword phrase "yesterday meeting." The first keyword phrase and the second keyword phrase may be transmitted to the data processor 225.

The data processor 225 may include a comparator 230, a query engine 235, and a machine learning engine 240. The data processor 225 may perform an action based on the first keyword phrase and the second keyword phrase. The data processor 225 may access a set of action rules corresponding to keywords that may include instructions for performing actions in response to a keyword. The data processor 225 may work in conjunction with the comparator 230 to compare the first keyword phrase and the second keyword phrase to the set of action rules to determine the action to perform. In an example, performing the action may include searching a data source using the second keyword phrase. For example, a rule for the keyword first keyword phrase "I forgot" and the second keyword phrase "flight San Francisco" may cause the data processor 235 to work in conjunction with the query engine 235 to perform a search for information regarding the user's flight to San Francisco. The query engine 235 may working in conjunction with the transceiver 210 or the API 245 to search external systems such as, for example, an airline ticketing system, a calendaring system, etc. In an example, performing the action may include transmitting a command to a software application. For example, the first keyword phrase may be "I should be" and the second keyword phrase may be "at the dentist at 2:30 PM on Thursday" and the data processor 225 may access a calendaring application via the transceiver 210 or the API 245 and may create a calendar entry for a dentist appointment on Thursday at 2:30 PM.

The data processor 225 may work in conjunction with the machine learning engine 240 to create and modify rules for performing actions based on the first keyword phrase and the second keyword phrase. For example, the query engine 235 may have queried airline X and retrieved no flight information and the user may have provided feedback indicating that airline Y should have been queried. The machine learning engine 240 may learn over time based on the feedback that the user's flight information should be located by querying airline Y.

The output generator 260 may generate output of performed action and may work in conjunction with the transceiver 210 to transmit the output to a user via one or more output channels. The results of the action may be output via a context appropriate output channel. The context appropriate output channel may be determined based on a context of the conversation (e.g., as determined by the environmental properties detector 250) and a privacy setting (e.g., as determined by the account management controller 255) of the first user. The output channels may include a variety of output delivery medium including, by way of example and not limitation, voice, text, email, picture, etc. The output channel may include a device indicator allowing the output generator 260 to generate output targeted to specific connected device (e.g., the connected devices 115A and 115B as described in FIG. 1, etc.) such as, for example, a personal assistant device, smartphone, table, smart television, etc. In an example, the output may be targeted to 1) one or more of the user's connected devices (e.g., first connected device 115A as described in FIG. 1, etc.) including the personal assistant application (e.g., the first personal assistant application 120A as described in FIG. 1, etc.) and/or 2) one or more other output channels near the user such as the outputs of other devices connect to the conversation bot 205 or the connected device.

The environmental properties detector 250 may identify the environmental context in which a conversation is occurring. The context may include other people present during the conversation, the location of the conversation, ambient noise levels, etc. The context may be used by the data processor 225 to identify data sources to be used in performing actions and may be used by the output 260 to determine output characteristics such as which output channel(s) to transmit output to and volume levels for transmitted output.

The environmental properties detector 250 may detect a change in an audio characteristic (e.g., background noise, other people, location, etc.) of the audio stream and may work select an output modifier based on the change in the audio characteristic. The output generator 260 may output the results of the action via the context appropriate output channel using the output modifier. For example, an increase in background noise may be detected in the audio stream and the environmental properties detector 250 may generate a volume level increase adjustment and transmit the adjustment to the output generator 260 resulting in an increased output volume for the results.

The environmental properties detector 250 may work in conjunction with the output generator 260 to alter the output volume and frequency based on the identified environmental context. For example, output may be generated at a lower volume and higher frequency (e.g., a whisper, etc.) to minimize audio travel in response to determining that there are unrecognized people in the vicinity of the output device.

The environmental properties detector 250 may identify a second user in the conversation included in the audio stream. For example, the environmental properties detector 250 may recognize a voice of another registered user using voice recognition techniques or by capturing a similar conversation from a personal assistant application included with a connected device of the second user. The environmental properties detector 250 may transmit the identity of the second user to the data processor 225 and the data processor 260 may search a first data source corresponding to the first user and a second data source corresponding to the second user when performing the action. For example, the first user may ask the second user "Do you remember what was said at yesterday's meeting?" and the data processor 260 may search a calendar application of the first user and a calendar application of the second user to identify a meeting both the first user and the second user attended. The data processor 260 may then access an email application of the first user and an email application of the second user to identify meeting minutes for the meeting. The data processor 260 may identify the meeting minutes using metadata of the files, text search, etc.

The environmental properties detector 250 may identify an audio characteristic in the audio stream and may switch the output from the output channel to an alternate output channel based on the audio characteristic. For example, the environmental properties detector 250 may determine that the ambient noise is above an acceptable threshold while output is being transmitted via voice to a personal assistant device and may work in conjunction with the output generator 260 to generate the output as a text message for transmission to a smartphone of the first user. In an example, the output may be switched from one output channel of a connected device to another output channel of the connected device. For example, the output may begin as audio output of the smartphone and may be switched to text displayed on the smartphone based on the audio characteristic.

The environmental properties detector 250 may determine a location of the conversation. For example, geolocation data may be collected from a connected device providing the audio stream and the environmental properties detector 250 may compare the geolocation data to geographical data reference to determine the location of the conversation. The environmental properties detector 250 may work in conjunction with the output generator 260 to select an output channel based on the determined location of the conversation. For example, the location of the conversation may be determined to be a public location such as a supermarket and output may be transmitted as a text message to a smartphone of the first user, rather than as audio over a speaker, to provide privacy.

The environmental properties detector 250 may work in conjunction with the output generator 260 to generate messages indicating that the output characteristics (e.g., output channel, output volume level, etc.) have been changed due to changes in the environmental context. For example, output may be generated indicating "Due to the high noise level in this location, I am switching to "smartphone" for continuing our conversation."

In an example, the environmental properties detector 250 may cause personal assistant functions to halt while the environmental context remains in an unsatisfactory state (e.g., noise levels above a threshold, unrecognized people, etc.). Output may be generated and transmitted indicating "Switching off persona assistant functions from this location until satisfactory conditions return." The environmental properties detector 250 may monitor the context and may enable personal assistant functions when the context has returned to satisfactory condition (e.g., noise below the threshold, unrecognized people no longer detected, etc.).

The environmental properties detector 250 may work in conjunction with the output generator 260 to generate directional audio signals for delivering output based on the environmental context. The environmental properties detector 250 may identify a direction of the first user from a device receiving the audio stream. The device may include a plurality of audio speakers and output of the results may include generating beam formed audio using the plurality of speakers by concentrating output power to members of the plurality of speakers in the direction of the first user. In an example, the directional audio may be transmitted to a plurality of connected devices based on the location of each device determined by the environmental properties detector 250 with the audio signal concentrated in a beam in the direction of the first user.

The account management controller 255 may determine privacy settings for user accounts for the system 200. The account management controller 255 may maintain a set of personalized privacy settings for the first user and may work in conjunction with the output generator 260 to generate output complying with the set of personalized privacy settings. The privacy settings may include preferred output channels for various environmental context conditions. Additionally or alternatively, the privacy settings may include rules for transmitting output based on elements (e.g., topics, etc.) of the conversation. For example, output relating to appointments including only the requestor (e.g., doctor appointment, etc.) may use a first privacy setting while an appointment involving the requestor and a second registered user may use a second privacy setting.

In an example, a single user privacy setting may indicate that output should be delivered only to the first user when other users are present in the environmental context. The account management controller 255 may direct the output generator 260 to generate and transmit output to the requestor (e.g., first user, etc.) even when other registered users may be participating in the conversation. The account management controller 255 may receive an indication from the environmental properties detector 250 that there is another user in the environmental context. The first user may have single user privacy enabled and the account management controller 255 may work in conjunction with the output generator 260 to identify the device of the first user as the output channel and may format the results from performing the action for delivery to the identified device of the first user.

In an example, a group level privacy setting may indicate that output be delivered to the requestor and other registered users participating in the conversation (e.g., friends, connections, everyone, etc.). A user may configure the privacy settings to authorize transmission of output based on relationship to the user. For example, the first user may configure group level privacy for conversation elements allowing output related to those elements to be delivered to friends or social network connections. For example, in the conversation between the first user and the second user involving yesterday's meeting, the first user may have group privacy enable for output relating to meetings and may have authorized the second user to receive output. The account management controller 255 may work in conjunction with the output generator 260 to generate and transmit the output to a connected device of the first user and a connected device of the second user.

The account management controller 255 may receive an indication from the environmental properties detector 250 that there is a group of users in the environmental context. The first user may have group level privacy configured to transmit output to a set of users. The account management controller 255 may work in conjunction with the output generator 260 to identify a multipath delivery channel (e.g., group text, email, simultaneous audio output, etc.) as the output channel. The multipath delivery channel may facilitate delivery of the output to each member of the set of users.

The output generator 260 may format the output for the identified multipath delivery channel.

The privacy settings may include preferred methods of delivery such as, by way of example and not limitation, voice communication, text messages, email, picture, spoke or written language, encrypted, etc. The preferred method of delivery may be configured based on environmental context or conversation elements indicating how output should be transmitted. For example, the first user may configure output corresponding to doctor appointments to be transmitted as text messages rather that via voice. The privacy settings may include an option to for authenticating (e.g., via username/password, biometrics, etc.) the user before transmitting output. In an example, portions of the messages transmitted may be encrypted using a set of rules to provide security for confidential information. In an example, a portion of the message may include a lock feature that may request the recipient to authenticate before unlocking. In an example, the content of a message may be presented in a picture to increase the difficulty of intercepting text. In an example, the audio or picture may include hidden information that may be used to authenticate the information received on another channel. For example, the virtual may send a code to a smartphone and the code may be entered by the user to authenticate a message transmitted on another channel. In another example, an audio pattern may be transmitted to a smartphone at a frequency outside of the human hearing range and a personal assistant device may play audio of the output upon receiving the audio pattern via an included microphone.

The account management controller 255 may work in conjunction with the output generator 260 to transmit a request for authentication to the first user and the results may be output upon receiving a response to the request for authentication. For example, a biometric authentication request may be transmitted to a smartphone of the first user including a fingerprint scanner and, upon receiving and validating a received fingerprint scan from the smartphone, audio output may be transmitted to a personal assistant device in proximity to the first user (e.g., as determined by the environmental properties detector 250).

Figure 4:
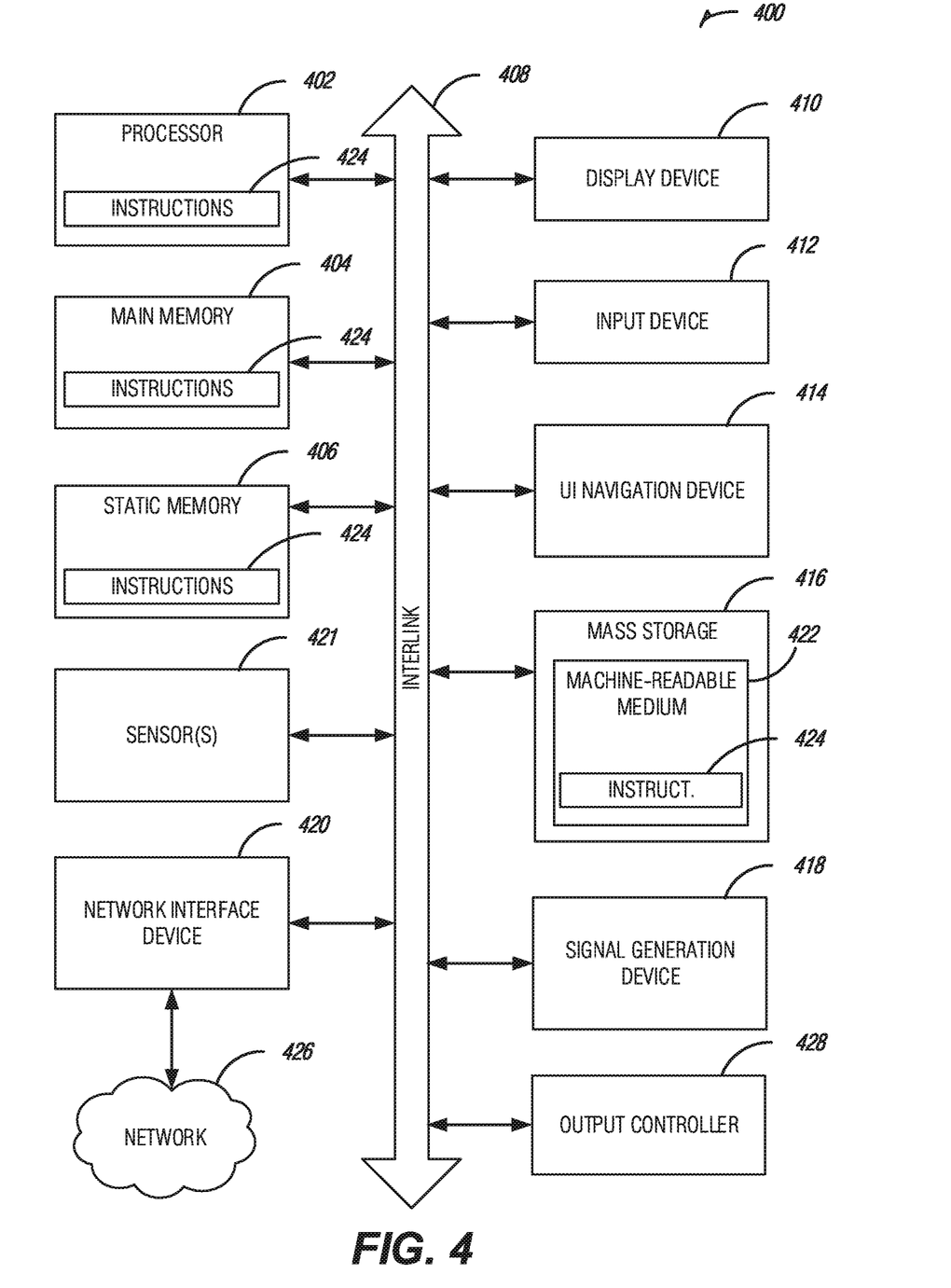
FIG. 4 is a block diagram illustrating an example of a machine upon which one or more embodiments may be implemented.

The conversation element extractor 215, the natural language processor 220, the data processor 225, the comparator 230, the query engine 235, the machine learning engine 240, the environmental properties detector 250, the account management controller 255, and the output generator 260 may comprise one or more processors (e.g., hardware processor 402 described in FIG. 4, etc.) that execute software instructions, such as those used to define a software or computer program, stored in a computer-readable storage medium such as a memory device (e.g., a main memory 404 and a static memory 406 as described in FIG. 4, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the conversation element extractor 215, the natural language processor 220, the data processor 225, the comparator 230, the query engine 235, the machine learning engine 240, the environmental properties detector 250, the account management controller 255, and the output generator 260 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 3:
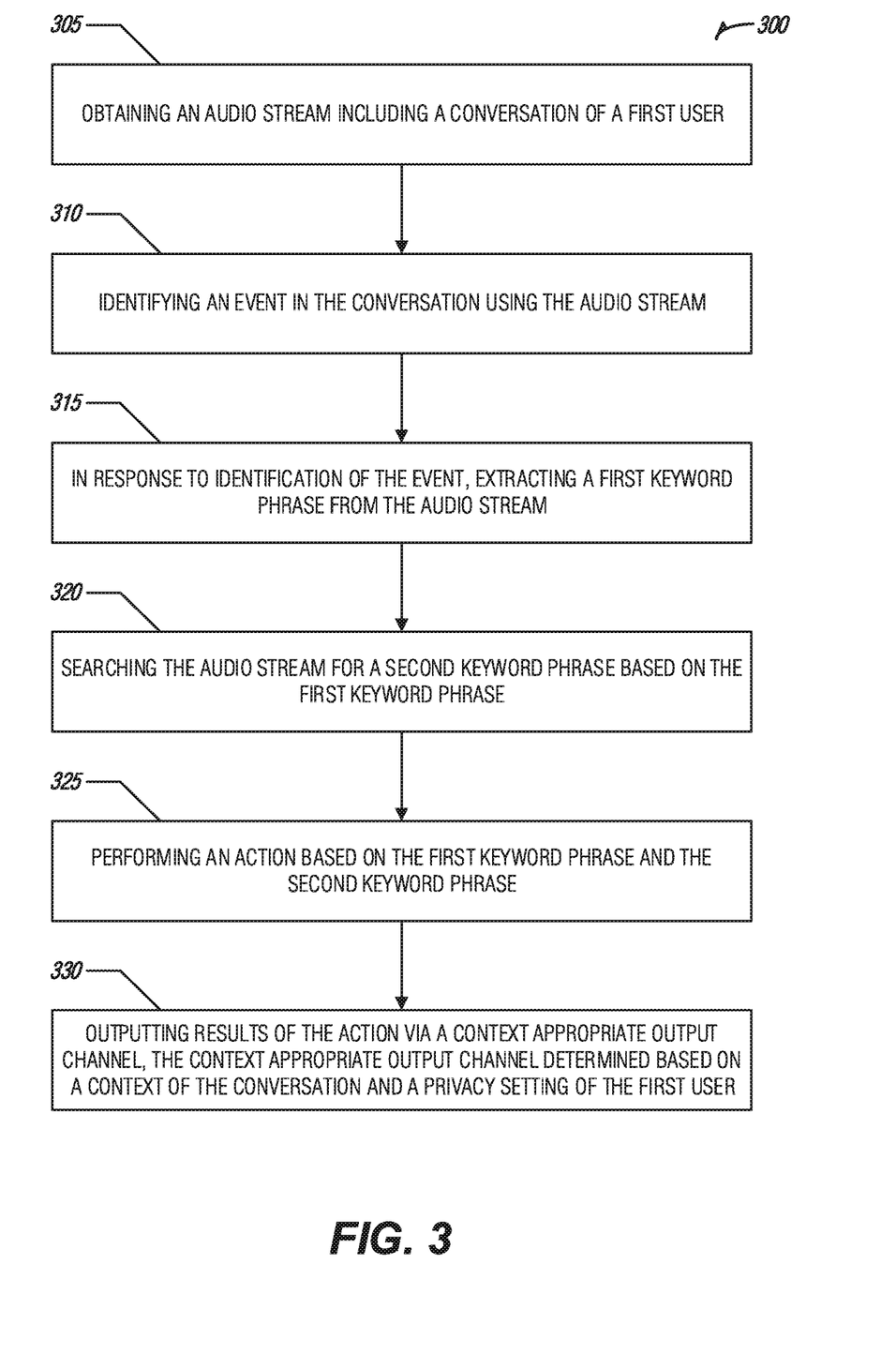
FIG. 3 illustrates an example of a method for implementing an adaptive conversation support bot, according to an embodiment.

FIG. 3 illustrates an example of a method 300 for implementing an adaptive conversation support bot, according to an embodiment. The method 300 may provide features as described in FIGS. 1 and 2. In the example method 300, an audio stream may be obtained that includes a conversation of a first user (e.g., at operation 305). The audio stream may, for example, be obtained from a microphone of a mobile device or from a microphone of a connected smart device (e.g., tablet, smart TV) connected to a conversation bot.

An event may be identified in the conversation using the audio stream (e.g., at operation 310). The event may be a non-transitional pause detected in the conversation included in the audio stream, for example. A first keyword phrase may be extracted from the audio stream in response to identification of the event (e.g., at operation 315). As discussed above, for example, the event may be detection of the first keyword phrase in the conversation included in the audio stream. The audio stream may be searched for a second keyword phrase based on the first keyword phrase (e.g., at operation 320).

Searching may be done in a variety of ways. In an example, a search direction corresponding to the first keyword phrase may be determined and, in response to the search direction determined as reverse, a portion of the audio stream occurring for a time period before the event may be searched for the second keyword phrase. In another example, a search direction corresponding to the first keyword phrase may be determined and, in response to the search direction determined as omnidirectional, a portion of the audio stream occurring for a first time period before the event and a second time period occurring after the event may be searched for the second keyword phrase. An action may be performed based on the first keyword phrase and the second keyword phrase (e.g., at operation 325). The action performed may, for example, include searching a data source using the second keyword phrase and/or transmitting a command to a software application. The results of the action may be output via a context appropriate output channel (e.g., at operation 330). The context appropriate output channel may be determined based on a context of the conversation and a privacy setting of the first user, for example. Actions and outputs may take a variety of forms, some of which are discussed below.

In one example, a second user may be identified in the conversation included in the audio stream and the action performed may include searching a first data source and a second data source using the second keyword phrase. The first data source may correspond to the first user and the second data source may correspond to the second user. In another example, a request for authentication may be transmitted to the first user and the results may be output upon receiving a response to the request for authentication. In yet another example, the results may be encrypted and the results may be output upon receipt of a decryption request from a device on the output channel. In yet another example, a direction may be identified of the first user from a device receiving the audio stream. The device may include a plurality of audio speakers and the device may be the output channel. Output of the results may include beamforming the output in the direction of the first user using the plurality of speakers. Actions and outputs may include determining a change in an audio characteristic of the audio stream, and an output modifier may be selected based on the change in audio characteristic. Output of the results of the action via the context appropriate output channel may use the output modifier.

In another example, the context may include the first user and another user and the privacy setting may include an option to output to a device of the first user. The device of the first user may be identified and the output channel and the results may be formatted for transmission to the identified device of the first user. In further examples, the context may include a group of users including the first user and the privacy setting may include an option to output to a set of users. A multipath delivery channel may be identified as the output channel. The multipath delivery channel may facilitate delivery to each member of the set of users. The output may be formatted for transmission to the identified multipath delivery channel. A location of the conversation may be determined and the output channel may be selected based on the determined location of the conversation.

An audio characteristic may be identified in the audio stream and output may be switched from the output channel to an alternate output channel based on the audio characteristic.

FIG. 4 illustrates a block diagram of an example machine 400 upon which any one or more of the techniques (e.g., methodologies) discussed herein may perform. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 400, and includes digital or analog communications signals or other intangible medium to facilitate communication of such software.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for facilitating conversational analysis, the system comprising:
    at least one processor; and
    memory including instructions that, when executed by the at least one processor, cause the at least one processor to perform operations to:
        obtain an audio stream including a conversation of a first user;
        identify an event in the conversation using the audio stream;
        in response to identification of the event, extract a first keyword phrase from the audio stream;
        search the audio stream for a second keyword phrase using the first keyword phrase;
        perform an action based on the first keyword phrase and the second keyword phrase;
        create a rule for the performed action based on the first keyword phrase and the second keyword phrase with a machine learning engine;
        receive feedback on the action performed based on the rule;
        modify the machine learning engine over time with the feedback to create a modified rule for performing actions;
        determine an environment associated with the conversation; and
        output results of the action via a context appropriate output channel, the context appropriate output channel determined based on a context of the conversation and the environment associated with the conversation.

2. The system of claim 1, where the instructions further cause the processor to perform operations to:
    identify a characteristic associated with the context appropriate output channel wherein the results of the action are output on the context appropriate output channel using a first medium; and
    output the results of the action on the context appropriate output channel using a second medium different from the first medium based on the identified characteristic associated with the context appropriate output channel.

3. The system of claim 2, wherein the first medium is audio and the second medium is text.

4. The system of claim 1, wherein the conversation is between the first user and a second user and the event is a word in the conversation and the second keyword phrase is searched for using the word in the first keyword phrase.

5. The system of claim 4, where the instructions further cause the processor to perform operations to identify the second user and the instructions to perform the action include instructions to use the second keyword phrase to search a first data source and a second data source, wherein the first data source corresponds to the first user and the second data source corresponds to the second user.

6. The system of claim 4, where the instructions further cause the processor to perform operations to:
   determine a relationship between the first user and the second user;
   identify a privacy setting based on the relationship between the first user and the second user; and
   identify the context appropriate output channel based on the privacy setting.

7. The system of claim 1, where the instructions further cause the processor to perform operations to:
   determine a location of the conversation; and
   select the context appropriate output channel based on the determined location of the conversation.

8. At least one non-transitory machine readable medium including instruction for facilitating conversational analysis that, when executed by a machine, cause the machine to perform operations to:
   obtain an audio stream including a conversation of a first user;
   identify an event in the conversation using the audio stream;
   in response to identification of the event, extract a first keyword phrase from the audio stream;
   search the audio stream for a second keyword phrase using the first keyword phrase;
   perform an action based on the first keyword phrase and the second keyword phrase;
   create a rule for the performed action based on the first keyword phrase and the second keyword phrase with a machine learning engine;
   receive feedback on the action performed based on the rule;
   modify the machine learning engine over time with the feedback to create a modified rule for performing actions;
   determine an environment associated with the conversation; and
   output results of the action via a context appropriate output channel, the context appropriate output channel determined based on a context of the conversation and the environment associated with the conversation.

9. The non-transitory machine readable medium of claim 8, further comprising instructions to:
   identify a characteristic associated with the context appropriate output channel wherein the results of the action are output on the context appropriate output channel using a first medium; and
   output the results of the action on the context appropriate output channel using a second medium different from the first medium based on the identified characteristic associated with the context appropriate output channel.

10. The non-transitory machine readable medium of claim 9, wherein the first medium is audio and the second medium is text.

11. The non-transitory machine readable medium of claim 8, wherein the conversation is between the first user and a second user and the event is a word in the conversation and the second keyword phrase is searched for using the word in the first keyword phrase.

12. The non-transitory machine readable medium of claim 11, further comprising instructions to identify the second user and the instructions to perform the action include instructions to use the second keyword phrase to search a first data source and a second data source, wherein the first data source corresponds to the first user and the second data source corresponds to the second user.

13. The non-transitory machine readable medium of claim 11, further comprising instructions to:
   determine a relationship between the first user and the second user;
   identify a privacy setting based on the relationship between the first user and the second user; and
   identify the context appropriate output channel based on the privacy setting.

14. The non-transitory machine readable medium of claim 8, further comprising instructions to:
   determine a location of the conversation; and
   select the context appropriate output channel based on the determined location of the conversation.

15. A method for facilitating conversational analysis, the method comprising:
   obtaining an audio stream including a conversation of a first user;
   identifying an event in the conversation using the audio stream;
   in response to identification of the event, extracting a first keyword phrase from the audio stream;
   searching the audio stream for a second keyword phrase using the first keyword phrase;
   performing an action based on the first keyword phrase and the second keyword phrase;
   creating a rule for the performed action based on the first keyword phrase and the second keyword phrase with a machine learning engine;
   receiving feedback on the action performed based on the rule;
   modifying the machine learning engine over time with the feedback to create a modified rule for performing actions;
   determining an environment associated with the conversation; and
   outputting results of the action via a context appropriate output channel, the context appropriate output channel determined based on a context of the conversation and the environment associated with the conversation.

16. The method of claim 15, further comprising instructions to:
   identify a characteristic associated with the context appropriate output channel wherein the results of the action are output on the context appropriate output channel using a first medium; and
   output the results of the action on the context appropriate output channel using a second medium different from the first medium based on the identified characteristic associated with the context appropriate output channel, wherein the first medium is audio and the second medium is text.

17. The method of claim 15, wherein the conversation is between the first user and a second user and the event is a word in the conversation and the second keyword phrase is searched for using the word in the first keyword phrase.

18. The method of claim 17, further comprising instructions to identify the second user and the instructions to perform the action include instructions to use the second keyword phrase to search a first data source and a second data source, wherein the first data source corresponds to the first user and the second data source corresponds to the second user.

19. The method of claim 17, further comprising instructions to:
- determine a relationship between the first user and the second user;
- identify a privacy setting based on the relationship between the first user and the second user; and
- identify the context appropriate output channel based on the privacy setting.

20. The method of claim 15, further comprising instructions to:
- determine a location of the conversation; and
- select the context appropriate output channel based on the determined location of the conversation.

\* \* \* \* \*